(12) United States Patent
Legrand

(10) Patent No.: US 7,210,231 B2
(45) Date of Patent: May 1, 2007

(54) NOISE-REDUCING CUTTING LINE FOR A VEGETATION CUTTING DEVICE

(75) Inventor: Emmanuel Legrand, Villeneuve (FR)

(73) Assignee: Speed France, Arnas (FR)

( * ) Notice: Subject to any disclaimer, the term of this patent is extended or adjusted under 35 U.S.C. 154(b) by 0 days.

(21) Appl. No.: 11/066,025

(22) Filed: Feb. 25, 2005

(65) Prior Publication Data

US 2005/0188544 A1    Sep. 1, 2005

(30) Foreign Application Priority Data

Mar. 1, 2004   (FR)   ................................. 04 02079

(51) Int. Cl.
*A01D 34/416*   (2006.01)
*A01G 3/06*   (2006.01)

(52) U.S. Cl. .................... 30/276; 30/347; 428/400

(58) Field of Classification Search ................ 30/276, 30/347; D8/8; 428/399, 397, 400; 56/12.7, 56/295
See application file for complete search history.

(56) References Cited

U.S. PATENT DOCUMENTS

| | | | | |
|---|---|---|---|---|
| 2,434,533 A | * | 1/1948 | Wurzburger | ................ 428/371 |
| 4,186,239 A | * | 1/1980 | Mize et al. | ................ 428/399 |
| 5,220,774 A | * | 6/1993 | Harbeke et al. | ............. 56/12.7 |
| D364,079 S | * | 11/1995 | Skinner | .......................... D8/8 |
| D379,052 S | * | 5/1997 | Skinner | .......................... D8/8 |
| RE36,940 E | * | 11/2000 | Fogle | .......................... 30/276 |
| 6,161,292 A | * | 12/2000 | Morabit et al. | ................ 30/276 |
| 6,874,235 B1 | * | 4/2005 | Legrand | ....................... 30/276 |
| 2005/0028390 A1 | * | 2/2005 | Legrand | ....................... 30/347 |
| 2005/0081389 A1 | * | 4/2005 | Legrand | ....................... 30/276 |
| 2005/0172501 A1 | * | 8/2005 | Fogle | ........................... 30/347 |
| 2005/0188547 A1 | * | 9/2005 | Legrand | ....................... 30/347 |

* cited by examiner

*Primary Examiner*—Hwei-Siu C. Payer
(74) *Attorney, Agent, or Firm*—Alston & Bird LLP

(57) ABSTRACT

A cutting line for brush-cutting, edge-trimming and similar has a generally circular cross-section and, on its periphery, has a plurality of notches spaced apart by a distance of between 12 and 19 mm approximately and aligned along at least one direction parallel to an axis of the line, the length of the notches, measured along the line, being substantially shorter than the spacing distance. The cutting line permits a reduction in the operating noise of vegetation cutting devices such as edge-trimmers, brush-cutters, etc.

13 Claims, 3 Drawing Sheets

| CASE | RPM | SMOOTH LINE (dB) | LINE OF THE INVENTION (dB) | DIFFERENCE (dB) |
|------|------|------|------|------|
| 1 | 2000 | 70.20 | 64.80 | -5.40 |
| 2 | 3000 | 81.40 | 69.80 | -11.60 |
| 3 | 6000 | 105.10 | 91.00 | -14.10 |
| 4 | 8000 | 115.00 | 101.30 | -13.70 |

NOISE-REDUCING CUTTING LINE FOR A VEGETATION CUTTING DEVICE

BACKGROUND OF THE INVENTION

1) Field of the Invention

This invention relates, in general, to devices for cutting vegetation, notably brush-cutters or edge-trimmers and, more specifically, the cutting elements made from synthetic material for such devices.

2) Description of Related Art

For several years, various shapes of cutting filaments or lines have been developed for use in a cutting head, driven by an electric or thermal motor, so that the rapid rotation of the head rotates the line or lines that tend to adopt a rectangular extension under the effect of centrifugal force. These lines are generally manufactured by extruding or drawing polyamides.

Whilst older lines had a circular cross-section and were entirely smooth, lines have now been developed with varied and/or evolutive transversal cross-sections, purported to reduce the operating noise of the device by acting on turbulence.

There are also lines which comprise edges, grooves, recesses or even line deformations along their length.

These known lines, although some do allow the noise to be substantially reduced whilst the device is being operated, nonetheless have one or more of the following disadvantages:
- the shape of the transverse section or its evolution may, in some instances, weaken the line and make it liable to break, notably at points where this transverse section is thinner;
- the specific transverse section of the line may compromise its efficient retaining in the cutting head, in particular if this section differs significantly from standard sections such as a circular or a square section;
- line manufacture is made more complicated and/or more onerous;

BRIEF SUMMARY OF THE INVENTION

This invention aims to remedy these prior art limitations. For this purpose, it proposes one 1 cutting line (10) for brush-cutting, edge-trimming and similar, characterised by the fact that it has a, generally circular, transverse section and by the fact that it has on its periphery a plurality of notches (11) spaced apart by approximately 12 to 19 mm and aligned at least in a direction parallel to an axis of the line, the length of the said notches measured along the line being substantially shorter than the said spacing.

Certain preferred, but not exhaustive, aspects of this cutting line are as follows:
- the notches are spaced apart by a distance of between 14 and 17 mm;
- the ratio between notch length and the said notch spacing is approximately 1:4 and 1:7;
- the length of the notches is between 2 and 3 mm approximately;
- the notches are generally concave and smooth at the base;
- the depth of the notches is between 0.4 and 0.08 mm approximately
- the length of the notches is greater than their width, measured in the circumferential direction of the line;
- the ratio between notch length and notch width is in the order of 4:3;
- the width of the notches is between 1.5 and 2.2 mm approximately;
- the notches are arranged in two essentially diametrically opposite rows;
- the notches in one row are offset in relation to the notches of the other row;
- the notches are formed by removing line material.

This invention also proposes a vegetation cutting system such as a brush-cutter or edge-trimmer, comprising a rotational cutting head that can receive one or more cutting lines, characterised by the fact that it comprises at least one cutting line strand as defined above and retention means that are able to retain the line in a position such that a row of notches is located in a region above or a region below the line.

BRIEF DESCRIPTION OF THE SEVERAL VIEWS OF THE DRAWINGS

Other aspects, aims and advantages of this invention will appear better on reading the following detailed description of the preferred embodiments of the invention, given by way of example, although not exhaustive, and referred to in the appended drawings, in which.

DETAILED DESCRIPTION OF THE INVENTION

With reference, firstly, to FIGS. 1, 2a, 2b and 3, which schematically illustrate a cutting filament or line (10) for a vegetation cutting device (brush-cutter, edge-trimmer, etc.).

This filament is made from a base having a circular cross-section, preferably having a standard diameter of 1.5 mm, 2 mm, 2.5 mm, 3 mm etc. In this example, the diameter is 3 mm.

This base with circular cross-section is preferably manufactured using a classic extrusion/drawing technique in an appropriate material, such as a polyamide or copolyamide. Numerous references to previous patents cite different synthetic materials that can be used to manufacture such lines.

A series of notches 11 is formed in the line 10, as will be seen in detail below.

Each notch is preferably formed by a material-removing operation using blades whose movement is controlled and synchronised with the linear movement of the line as it leaves the extrusion/drawing process.

In the present example, the notches 11 are distributed along two rows or lines L1 and L2 extending parallel to the longitudinal axis A of the line and diametrically opposed. In each row, the notches are spaced at a regular pitch from one another, preferably of around 12 and 19 mm, and more specifically, between 14 and 17 mm. In this example, the pitch is 14.5 mm.

It will be noted here that this pitch may vary to a certain extent over the length of the line, provided that it essentially remains within the aforementioned limits.

Each notch preferably has a depth between 0.4 and 0.8 mm approximately (here 0.6 mm).

The length of the notches measured along the filament is substantially shorter than the pitch between the aforementioned notches. Advantageously, the ratio between notch length and said pitch lies between 1:4 and 1:7 approximately.

In practical terms, a notch length can be provided of between 2 and 3 mm approximately (here 2.6 mm).

According to another embodiment of the line described here, the length of the notches is greater than their width, measured in the circumferential direction of the filament, with a length/width ratio in the order of 4:3.

In practical terms, a notch width can be provided of between 1.5 and 2.2 mm approximately (here 1.8 mm).

The blades or other methods used to create the notches are compliant in such a way that the bottom of each notch has a regular, smooth concave surface. This contributes in particular, in combination with the depth parameter, towards avoiding the weakening of the line around the notches.

Figure 1:
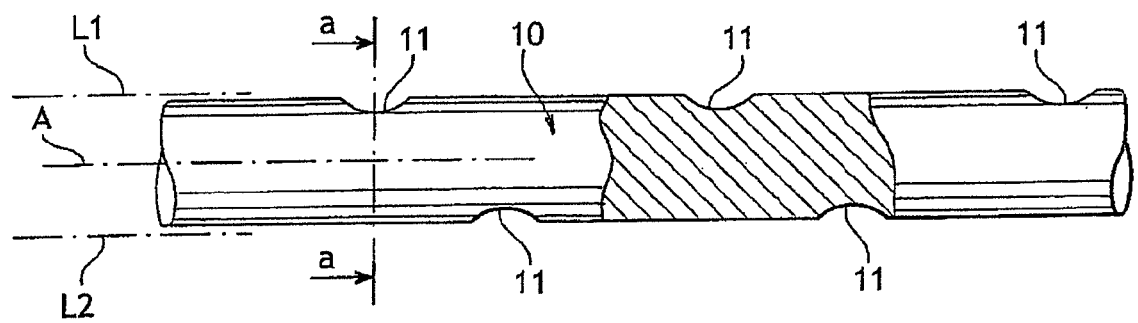
FIG. 1 is a partial, side elevation view and a partial axial section view of a cutting line of the invention.
Figure 2A:
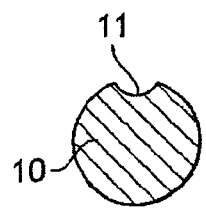
FIGS. 2a and 2b are cross-section views of the line in FIG. 1 at lines a—a and b—b respectively.
Figure 2B:
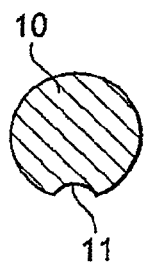
Figure 3:
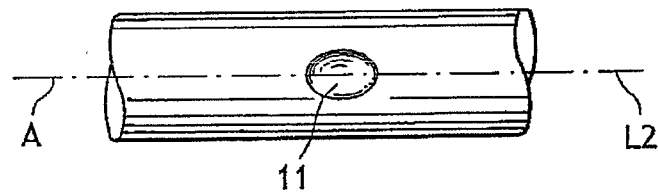
FIG. 3 is a front view of a notch formed in the line of FIGS. 1, 2a and 2b.

As shown in FIG. 1, notches 11 in row L1 are offset in relation to those in the opposite row L2. The applicant has found that the extent of offset only has little influence on the level of noise reduction obtained with the line of the invention. The notches in the two rows may even be located on the same level as each other whilst maintaining a substantially identical noise reduction level.

It is preferable however that the notches in the two rows should be offset, insofar as the cross section of the filament at a given notch will be less reduced than in the case of two opposite notches, and the line is therefore more robust.

The applicant has found that a line as described above provides a perceptible reduction in noise level irrespective of the orientation of the line.

However, the applicant has found that optimum results are obtained if the two rows of notches are located, when the device is in use, in the upper and lower areas of the line respectively.

Therefore, in an advantageous embodiment, the line of the invention is used with a cutting device whose rotational cutting head is able to retain the line in a controlled orientation.

In this respect, to facilitate this oriented retaining of the line, provision may be made for the latter to have a non-circular cross-section, for example polygonal.

Figure 4:
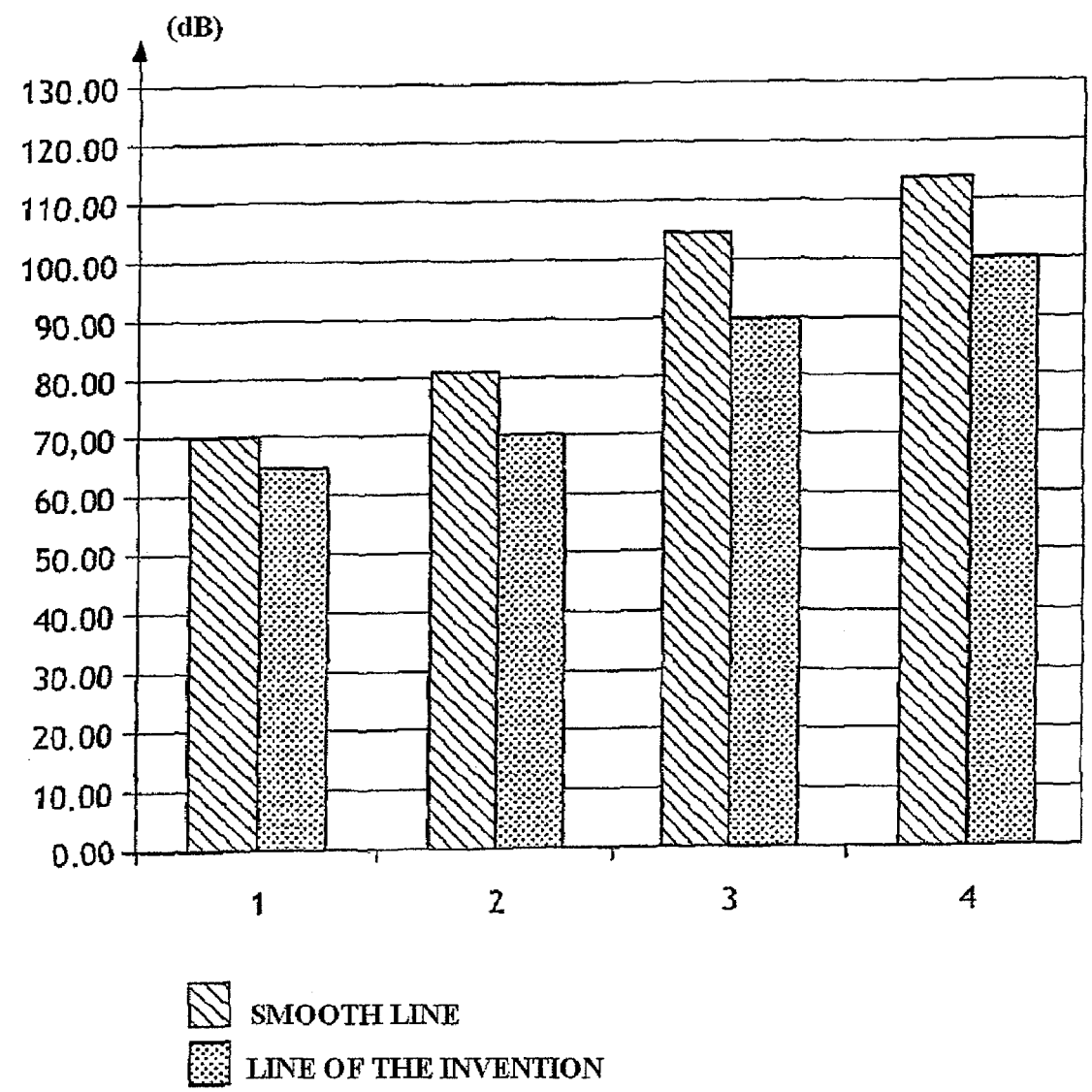
FIG. 4 is a graph illustrating the improvement provided by the cutting line of the invention in terms of reducing operating noise.
Figure 5:
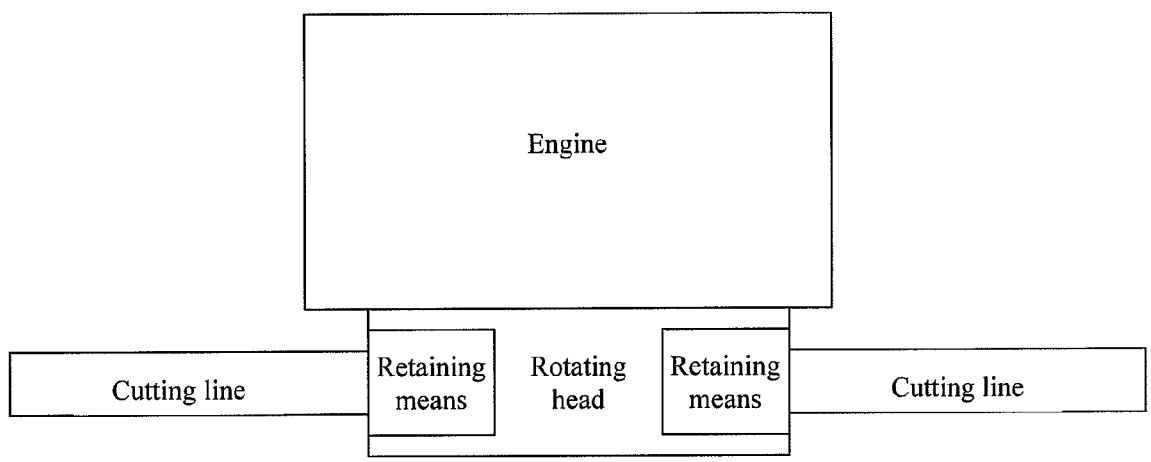
FIG. 5 is a schematic illustration of a brush-cutter which includes a rotating head and retention means in accordance with the present invention.

FIG. 4 shows the noise reduction achieved by a line of the invention having the aforementioned size parameters.

For this purpose, we conducted comparative tests with this line and with a smooth cylindrical line, having the same diameter of 3 mm, using four cutting head rotation speeds of 2000, 3000, 6000 and 8000 rpm respectively. The line of the invention was retained in the cutting head in such a way that the two rows of notches were located at the top and bottom of the line.

The noise level was measured with a decibelmeter in the audible range, placed in the same position each time.

It was found that, with the highest speeds, a noise reduction substantially greater than 10 dB was obtained.

Evidently, several variations may be made to the invention.

As a first variant, three or more rows of notches may be provided.

Secondly, a cutting line of the invention may be manufactured in two or more different materials, notably by co-extrusion or by applying to a one-piece line a coating that has a specific function, in particular an anti-wear function.

In addition, depending on the diameter of the line, this may be used either in individual strands of a given length (large diameter lines, for heavy-duty work), or in a spool with automatic unreeling (small diameter line for lawns.) It may be used in a cutting head able to receive a single line strand or several strands.

That which is claimed:

1. A cutting line for vegetation-cutting or edge-trimming, characterised by the fact that the cutting line has a generally circular cross-section and by the fact that on its periphery it has a plurality of notches with adjacent notches spaced apart by a distance of between about 12 and 19 mm and aligned along two essentially diametrically opposite rows which extend in a direction parallel to an axis of the line, the length of said notches, measured along the line, being substantially shorter than the spacing distance.

2. The cutting line according to claim 1, characterised by the fact that the notches in one row are offset in relation to the notches in the other row.

3. A cutting line for vegetation-cutting or edge-trimming, characterised by the fact that the cutting line has a generally circular cross-section and by the fact that on its periphery it has a plurality of notches with adjacent notches spaced apart by a distance of between about 12 and 19 mm and aligned according to at least one direction parallel to an axis of the line, the length of said notches, measured along the line, being substantially shorter than the spacing distance.

4. The cutting line according to claim 3, characterised by the fact that the notches are spaced apart by a distance of between about 14 and 17 mm.

5. The cutting line according to claim 3, characterised by the fact that the ratio between the length of the notches and the spacing distance is between about 1:4 and 1:7.

6. The cutting line according to claim 3, characterised by the fact that the length of the notches is between about 2 and 3 mm.

7. The cutting line according to claim 3, characterised by the fact that the notches have a generally concave and smooth base.

8. The cutting line according to claim 3, characterised by the fact that the depth of the notches is between about 0.4 and 0.8 mm.

9. The cutting line according to claim 8, characterised by the fact that the length of the notches is greater than their width, measured in the circumferential direction of the line.

10. The cutting line according to claim 9, characterised by the fact that the ratio between the length of the notches and their width is about 4:3.

11. The cutting line according to claim 9, characterised by the fact that the width of the notches is between about 1.5 and 2.2 mm.

12. A device for cutting vegetation comprising a rotating head that can receive one or more cutting lines, characterised by the fact that the device comprises at least one strand of a cutting line according to claim 3 and retention means for retaining the line in such a position that, when in operation, a row of notches is located in an upper and/or lower region of the line.

13. The cutting line according to claim 3, characterised by the fact that the notches are formed by removing line material.

* * * * *